United States Patent
Han et al.

(10) Patent No.: US 11,926,339 B2
(45) Date of Patent: Mar. 12, 2024

(54) METHOD FOR CONSTRUCTING DRIVING COORDINATE SYSTEM, AND APPLICATION THEREOF

(71) Applicant: GREAT WALL MOTOR COMPANY LIMITED, Hebei (CN)

(72) Inventors: Rutao Han, Hebei (CN); Jianyong Ge, Hebei (CN); Hongwei Liu, Hebei (CN); Yaxing Ren, Hebei (CN); Wenfeng Cui, Hebei (CN); Tianpei Wang, Hebei (CN); Kai Zhang, Hebei (CN); Ruying Teng, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 331 days.

(21) Appl. No.: 17/281,554

(22) PCT Filed: Sep. 27, 2019

(86) PCT No.: PCT/CN2019/108402
§ 371 (c)(1),
(2) Date: Mar. 30, 2021

(87) PCT Pub. No.: WO2020/063816
PCT Pub. Date: Apr. 2, 2020

(65) Prior Publication Data
US 2021/0362741 A1 Nov. 25, 2021

(30) Foreign Application Priority Data

Sep. 30, 2018 (CN) .......................... 201811153712.1
Sep. 30, 2018 (CN) .......................... 201811153713.6
Sep. 30, 2018 (CN) .......................... 201811154076.4

(51) Int. Cl.
*B60W 60/00* (2020.01)

(52) U.S. Cl.
CPC ....... *B60W 60/001* (2020.02); *B60W 2420/42* (2013.01); *B60W 2552/30* (2020.02); *B60W 2552/53* (2020.02)

(58) Field of Classification Search
None
See application file for complete search history.

(56) References Cited

U.S. PATENT DOCUMENTS 6,370,474 B1   4/2002   Hiwatashi et al.
2005/0228588 A1  10/2005  Braeuchle et al.
(Continued)

FOREIGN PATENT DOCUMENTS

CN      1979524 A    6/2007
CN    101915672 A   12/2010
(Continued)

OTHER PUBLICATIONS

Selloum; "Lane level positioning using particle filtering," 2009 12th International IEEE Conference on Intelligent Transportation Systems, St. Louis, MO, USA, 2009, pp. 1-6, doi: 10.1109/ITSC.2009.5309850 (Year: 2009).*

(Continued)

*Primary Examiner* — David P. Merlino
(74) *Attorney, Agent, or Firm* — Calfee, Halter & Griswold LLP

(57) ABSTRACT

A method and a system for constructing a driving coordinate system for use in the field of smart transport. The method for constructing a driving coordinate system comprises: determining the road boundary line on one side of the road on which a current vehicle is situated as a reference line for constructing a driving coordinate system; in a vehicle coordinate system, determining the reference line point having the smallest distance between the reference line and the current vehicle position as an origin point OF of the driving (Continued)

coordinate system; on the basis of the origin point OF, determining the road guiding line direction as the XF axis of the driving coordinate system and determining the direction relative to the road guiding line direction according to the left-hand rule as the YF axis of the driving coordinate system; and, on the basis of the origin point OF, the XF axis, and the YF axis, forming a corresponding driving coordinate system.

10 Claims, 5 Drawing Sheets

(56) References Cited

U.S. PATENT DOCUMENTS

| | | | |
|---|---|---|---|
| 2007/0198188 A1 | 8/2007 | Leineweber et al. | |
| 2007/0288133 A1 | 12/2007 | Nishira et al. | |
| 2011/0010021 A1 | 1/2011 | Kobayashi | |
| 2013/0158871 A1* | 6/2013 | Joh | G01C 21/28 703/2 |
| 2013/0173232 A1 | 7/2013 | Meis et al. | |
| 2015/0165972 A1* | 6/2015 | Takemae | G06V 20/588 348/148 |
| 2015/0165973 A1* | 6/2015 | Takemae | B60R 1/00 348/148 |
| 2018/0197022 A1* | 7/2018 | Fujikawa | G08G 1/166 |
| 2019/0049724 A1* | 2/2019 | Kimura | G02B 27/01 |
| 2021/0295060 A1* | 9/2021 | Lee | G01S 7/4808 |

FOREIGN PATENT DOCUMENTS

| | | |
|---|---|---|
| CN | 102201035 A | 9/2011 |
| CN | 102529975 A | 7/2012 |
| CN | 103047987 A | 4/2013 |
| CN | 103308056 A | 9/2013 |
| CN | 103901411 A | 7/2014 |
| CN | 104239741 A | 12/2014 |
| CN | 104854639 A | 8/2015 |
| CN | 105206090 A | 12/2015 |
| CN | 105427669 A | 3/2016 |
| CN | 105667518 A | 6/2016 |
| CN | 105761507 A | 7/2016 |
| CN | 105974917 A | 9/2016 |
| CN | 106289271 A | 1/2017 |
| CN | 106463064 A | 2/2017 |
| CN | 106560347 A | 4/2017 |
| CN | 106601029 A | 4/2017 |
| CN | 106875744 A | 6/2017 |
| CN | 107356933 A | 11/2017 |
| CN | 107465890 A | 12/2017 |
| CN | 107850450 A | 3/2018 |
| CN | 107945574 A | 4/2018 |
| CN | 108082185 A | 5/2018 |
| CN | 108377252 A | 8/2018 |
| CN | 108519605 A | 9/2018 |
| DE | 10327695 A1 | 1/2005 |
| EP | 3249627 A1 | 11/2017 |
| IN | 107310475 A | 11/2017 |
| IN | 108454619 A | 8/2018 |
| JP | H07225127 A | 8/1995 |
| JP | H08313282 A | 11/1996 |
| JP | H1186183 | 3/1999 |
| JP | 2007331458 A | 12/2007 |
| JP | 2009214786 A | 9/2009 |
| JP | 2010102575 A | 5/2010 |
| JP | 2012113431 A | 6/2012 |
| JP | 2013045227 A | 3/2013 |
| JP | 2015191240 A | 11/2015 |
| JP | 2018005811 A | 1/2018 |

OTHER PUBLICATIONS

Han I., Car speed estimation based on cross-ratio using video data of car-mounted camera (black box), Forensic Science International 269 (2016) 89-96.

Chen Y., Chen Y., Calculation method of preceding vehicle distance based on monocular vision, with English abstract, Journal of Mechanical & Electrical Engineering, 2014, 31(11):1499-1504.

English Translation of International Search Report from PCT/CN2019/108399 dated Dec. 27, 2019 (2 pages).

Qian F., He Y., Song P., Development and Research of Automobile Two-dimensional Motion Parameter Test System, with English abstract, Journal of Wuhan University of Technology, Apr. 2016, 5 pages.

* cited by examiner

METHOD FOR CONSTRUCTING DRIVING COORDINATE SYSTEM, AND APPLICATION THEREOF

CROSS-REFERENCE TO RELATED APPLICATIONS

This application is the National Stage of International Application No. PCT/CN2019/108402, filed on Sep. 27, 2019, which claims priority to Chinese Patent Application No. 201811154076.4, filed on Sep. 30, 2018, Chinese Patent Application No. 201811153713.6, filed on Sep. 30, 2018, AND Chinese Patent Application No. 201811153712.1, filed on Sep. 30, 2018, which are incorporated herein by reference in their entireties.

FIELD OF THE INVENTION

The present invention relates to the field of intelligent transportation, in particular to a driving, coordinate system construction method and application.

BACKGROUND OF THE INVENTION

At present, vehicles with an Autonomous Driving System (ADS) are gradually brought: to the market, which greatly promotes the development of intelligent transportation. The ADS collects data of lane lines around a vehicle and data of a road target (for example, other vehicles ahead, also called target) in real time by using various sensing devices installed on the vehicle, identifies static characteristics and dynamic characteristics of the target, and determines a position of the target on the road, so that an automatic driving computer can determine a potential danger in the shortest time, and take effective measures to prevent the danger from occurring.

Therefore, it can be seen that determining the effective information on the road such as lane line data and road target data is very important for ADS. In the prior art, the effective information collected by the sensing device is expressed by a vehicle coordinate system, for example, effective information of a target mapped on a road is determined in the vehicle coordinate system, and an automatic driving computer is further caused to calculate and judge the target information in the determined vehicle coordinate system to determine a driving strategy of the vehicle.

However, in a process of implementation the inventors of the present application find out that: under the condition that the road is curved, it is difficult to determine effective information (for example, which lane the target is in, an effective longitudinal distance of the target, and the like) of the target mapped on the road depending on the vehicle coordinate system, so that a lane in which the target is located, a horizontal distance of the target, a longitudinal distance of the target, and the like may have large deviation, and even a judgment error may occur. That is to say, the vehicle coordinate system does not truly reflect the relative relationship between the vehicle and the surrounding environment (particularly, the lane line and the target), and needs to be improved.

SUMMARY OF THE INVENTION

In view of this, the present invention aims to provide a driving coordinate system construction method, so as to solve the problem that a vehicle coordinate system cannot truly reflect a relative relationship between a vehicle and a surrounding environment.

To achieve the above object, a technical solution of the present invention is implemented as follows:

A driving coordinate system construction method may comprises: determining a road boundary line on one side of a road on which a vehicle is located as a reference line for establishing a driving coordinate system; determining a reference line point with the minimum distance between a vehicle position and the reference line as an origin $O_F$ of the driving coordinate system in a vehicle coordinate system; determining a road guiding line direction as an $X_F$ axis of the driving coordinate system based on the origin $O_F$, and determining a direction following a left-hand rule with the road guiding line direction as a $Y_F$ axis of the driving coordinate system; and forming the corresponding driving coordinate system based on the origin $O_F$, the $X_F$ axis and the $Y_F$ axis.

Compared with the prior art, the driving coordinate system construction method according to the present invention has the following advantages: a driving coordinate system is constructed in the present invention, and through the driving coordinate system, the target-oriented area division can be well realized, and more accurate distance information can be obtained at the same time, particularly in the bend working condition, the longitudinal arc length is used in the driving coordinate system to represent the longitudinal distance of the road target and the like, and the distance between the vehicle and the road target can be expressed more realistically compared with the straight-line distance in the vehicle coordinate system.

Another object of the present invention is to provide a driving coordinate system construction system, so as to solve the problem that a vehicle coordinate system cannot truly reflect a relative relationship between a vehicle and a surrounding environment.

To achieve the above-mentioned object, a technical solution of the present invention is implemented as fallows:

A driving coordinate system construction system may comprises: a reference line determination module, used for determining a road boundary line on one side of a road on which a vehicle is located as a reference line for establishing a driving coordinate system; an origin determination module, used for determining a reference line point with the minimum distance between a vehicle position and the reference line as an origin $O_F$ of the driving coordinate system in a vehicle coordinate system; a coordinate axis determination module, used for determining a road guiding line direction as an $X_F$ axis of the driving coordinate system based on the origin $O_F$ and determining a direction following a left-hand rule with the road guiding line direction as a $Y_F$ axis of the driving coordinate system; and a coordinate system establishment module, used for forming the corresponding driving coordinate system based on the origin $O_F$, the $X_F$ axis and the $Y_F$ axis.

The driving coordinate system construction system has the same advantages as the above-mentioned driving coordinate system construction method over the prior art, and details are not described here.

Another object of the present invention is to provide a method and system for determining the coordinates of a lane line and a method and system for determining the coordinates of a road target, so as to implement the application of the driving coordinate system.

To achieve the above-mentioned object, a technical solution of the present invention is implemented as follows:

A method for determining the coordinates of a lane line may comprises: constructing the driving coordinate system by using the above-mentioned driving coordinate system construction method; and calculating the coordinates of the lane line in the driving coordinate system.

A system for determining the coordinates of a lane line may comprises: the above-mentioned driving coordinate system construction system, used for constructing a driving coordinate system; and a lane line coordinate calculation module, used for calculating the coordinates of the lane line in the driving coordinate system.

A method for determining the coordinates of a road target may comprises: constructing the driving coordinate system by using the above-mentioned driving coordinate system construction method; and calculating the coordinates of the road target in the driving coordinate system.

A system for determining the coordinates of a road target may comprises: the above-mentioned driving coordinate system construction system, used for constructing a driving coordinate system; and a target coordinate calculation module, used for calculating the coordinates of the road target in the driving coordinate system.

Compared with the prior art, the method and system for determining the coordinates of a lane line and the method and system for determining the coordinates of a road target according to the present invention determine the coordinates of the lane line and the road target by using the driving coordinate system, thus being capable of more truly expressing the relationship between the vehicle and the lane line and the road target, saving a lot of complicated calculation processes in the vehicle coordinate system, and contributing to the area division of the road target. Other features and advantages of the present invention will be described in detail in the specific embodiments below.

BRIEF DESCRIPTION OF DRAWINGS

The drawings, which form a part of the present invention, are used to provide a further understanding of the present invention. The exemplary embodiments of the present invention and the description thereof are used to explain the present invention, and do not constitute an improper limitation on the present invention. In the drawings.

BRIEF DESCRIPTION OF REFERENCE SIGNS

810. Reference line determination module; 820. Origin determination module; 830. Coordinate: axis determination module; 840. Coordinate system establishment module: 850. Reference line switching module; 860. Navigation direction information acquisition module; 870. Road type judgment module.

DETAILED DESCRIPTION OF THE EMBODIMENTS

It should be noted that, in the case of no conflict, the embodiments of the present invention and features in the embodiments can be combined with each other.

The present invention will be described in detail below with reference to the drawings and embodiments.

First Embodiment

Figure 1:
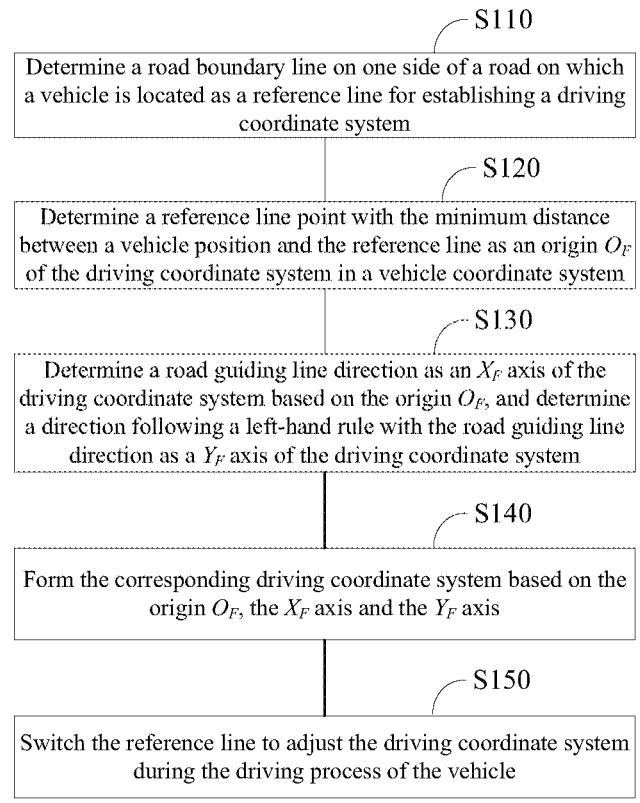
FIG. 1 is a schematic flowchart of a driving coordinate system construction method according to the first embodiment of the present invention.

FIG. 1 is a schematic flowchart of a driving coordinate system construction method according to the first embodiment of the present invention, wherein the driving coordinate system construction method is used to establish a new driving coordinate system that is suitable for various road conditions (particularly in the bend working condition) and reflects the mapping relationship between the vehicle, the target and the road. In order to more clearly describe the definition and construction method of the driving coordinate system in the embodiments of the present invention, a global coordinate system and a vehicle coordinate system commonly used in vehicle automatic driving are first described here.

The global coordinate system $X_GO_GY_G$ is based on the geodetic coordinate system, $X_G$ points to the north, $Y_G$ points to the east, the angle direction is clockwise as positive, and the angle range is [0, 360°]. Map lane line information, etc. are given based on the global coordinate system.

The vehicle coordinate system $X_HO_HY_H$ is based on the vehicle. $X_H$ points to the longitudinal axis of the vehicle and $Y_H$ points to the horizontal axis of the vehicle. Following the right-hand rule, counterclockwise is positive. The output information of the sensors on the vehicle, such as the camera, lidar and millimeter wave radar, is given based on the vehicle coordinate system.

According to the definition of the global coordinate system and the vehicle coordinate system, the driving coordinate system according to an embodiment of the present invention can be correspondingly expressed as $X_FO_FY_F$. The construction of the driving coordinate system requires determining the origin $O_F$ and the directions of the $X_F$ axis and $Y_F$ axis. Accordingly, as shown in FIG. 1, the driving coordinate system construction method according to an embodiment of the present invention can comprise the following steps:

Step S110, determining a road boundary line on one side of a road on which a vehicle is located as a reference line for establishing a driving coordinate system;

Step S120, determining a reference line point with the minimum distance between a vehicle position and the reference line as an origin $O_F$ of the driving coordinate system in a vehicle coordinate system;

Step S130, determining a road guiding line direction as an $X_F$ axis of the driving coordinate system based on the origin $O_F$, and determining a direction following a left-hand rule with the road guiding line direction as a $Y_F$ axis of the driving coordinate system; and Step S140, forming the corresponding driving coordinate system based on the origin $O_F$, the $X_F$ axis and the $Y_F$ axis.

That is to say, the driving coordinate system $X_FO_FY_F$ is constructed, wherein the road boundary line (the leftmost lane line or the rightmost lane boundary line) is taken as the reference line, $X_F$ points to the road guiding line direction, and $Y_F$ and the road guiding line direction follow the left-hand rule.

It should be noted that, the data involved in the process of constructing the driving coordinate system $X_FO_FY_F$ and the data involved in the process of calculating the coordinates of the lane line, the road target, and the like in the driving coordinate system $X_FO_FY_F$, such as the coordinates of the reference line, can be global high-precision map data, local camera data, or other data capable of providing road-related information. The data source is flexible, which is not limited in the embodiments of the present invention.

Figure 2:
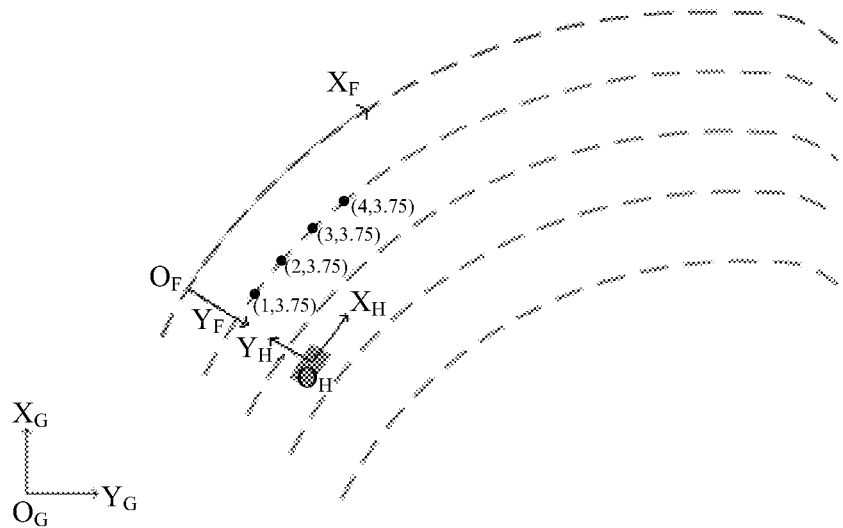
FIG. 2 is a schematic diagram of a driving coordinate system $X_FO_FY_F$, a global coordinate system $X_GO_GY_G$ and a vehicle coordinate system $X_HO_HY_H$ according to an embodiment of the present invention.

FIG. 2 is a schematic diagram of a driving coordinate system $X_FO_FY_F$, a global coordinate system $X_GO_GY_G$ and a vehicle coordinate system $X_HO_HY_H$ according to an embodiment of the present invention. As shown in FIG. 2, the driving coordinate system $X_FO_FY_F$ is a coordinate system that is established on the road boundary line and is completely consistent with the road trend. After the origin $O_F(X_{Fo}, Y_{Fo})$ is determined, the arc length distance between each point on the road boundary line and the driving coordinate origin $O_F$ $(X_{Fo}, Y_{Fo})$ can be calculated as the driving ordinate $X_{Fi}$ of each point. Therefore, the longitudinal axis $X_F$ of the driving coordinate system is completely consistent with the road trend, and the driving abscissa of each reference line point is $Y_{Fi}=0$. Thus, the vehicle position, the lane line, the target and the like can be given based on the driving coordinate system, particularly in the bend working condition, the arc length distance of the real bend is taken as target distance information to be output. Compared with the vehicle coordinate system, the situation of target area attribute and effective distance error can be avoided. In addition, if each lane line is described by a point in the driving coordinate system, it is easy to know that the abscissas of points on the lane line in the driving coordinate system are the same, and only the ordinates are different. For example, referring to FIG. 2, the ordinates increase sequentially on the selected lane line, and the abscissas are all 3.75. Therefore, the lane line can be described by using the ordinates of the lane line in the driving coordinate system.

In addition, after the driving coordinate system $X_FO_FY_F$ is constructed, in the subsequent automatic driving data processing, the lane line and the target have the double attributes of the vehicle coordinate system and the driving coordinate system at the same time, which can be selected according to needs.

In a preferred embodiment, the driving coordinate system construction method according to an embodiment of the present invention can further comprise:

Step S150, switching the reference line to adjust the driving coordinate system during the driving process of the vehicle.

For example, whether the driving coordinate system needs to be adjusted is determined according to the current road condition, the current driving condition and the like, so that the driving coordinate system can be consistent with the road trend all the time, and the mapping relationship between the vehicle, the target and the road can be reflected more accurately.

Figure 3:
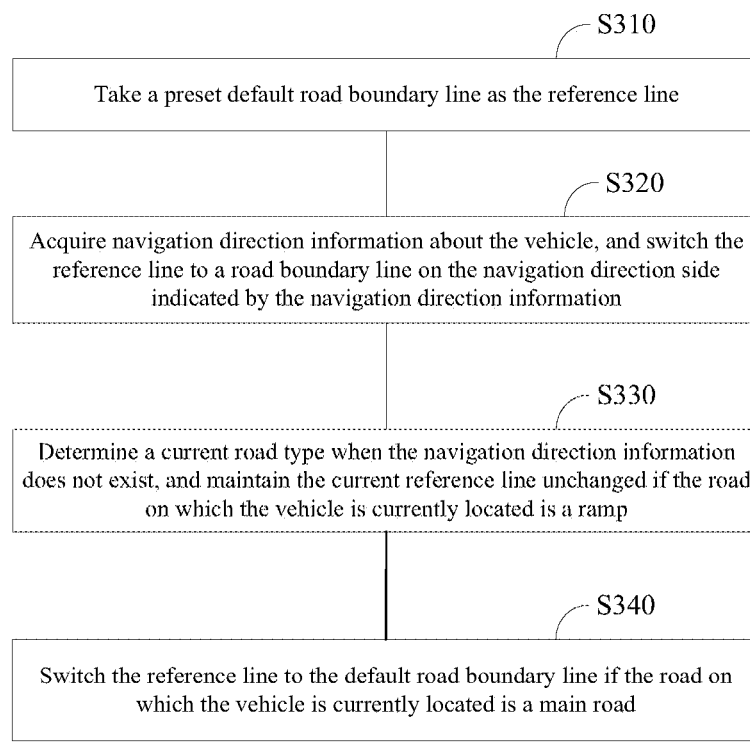
FIG. 3 is a schematic diagram of a reference line switching rule according to an embodiment of the present invention.

FIG. 3 is a schematic diagram of a reference line switching rule according to an embodiment of the present invention. As shown in FIG. 3, switching the reference line can comprise:

Step S310, taking a preset default road boundary line as the reference line.

Figure 4:
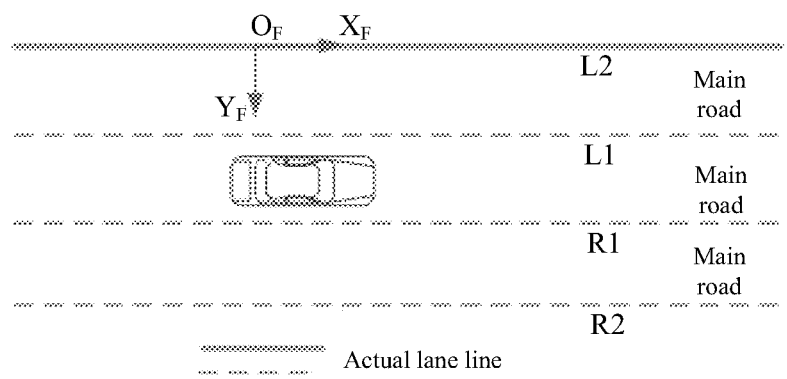
FIG. 4 is a schematic diagram of the default road boundary line being the leftmost road boundary according to an embodiment of the present invention.

For example, the default road boundary line is the leftmost road boundary with the position and the defined driving coordinate system $X_FO_FY_F$ as shown in FIG. 4. L1 and L2 respectively indicate two lane lines on the left side of the vehicle, and R1 and R2 respectively indicate two lane lines on the right side of the vehicle.

Step S320: acquiring navigation direction information about the vehicle, and switching the reference line to a road boundary line on the navigation direction side indicated by the navigation direction information.

Figure 5:
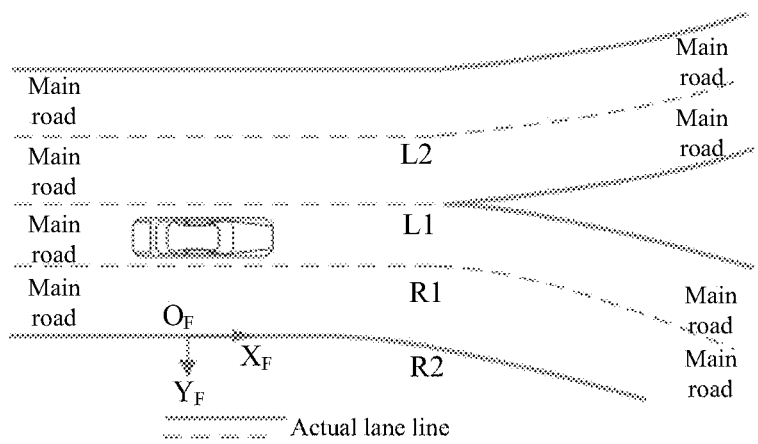
FIG. 5 is a schematic diagram of determining a reference line based on a navigation direction according to an embodiment of the present invention.

Specifically, when there is navigation direction information, the road boundary line on the navigation direction side is taken as the reference line of the driving coordinate system, and the driving reference line is switched (or maintained) when there is a navigation prompt. For example, as shown in FIG. 5, the navigation direction information indicates that the navigation direction is to the right, and then the rightmost road boundary line is the reference line.

Referring again to FIG. 3, in a preferred embodiment, switching the reference line can further comprise:

Step S330: determining a current road type when the navigation direction information does not exist, and maintaining the current reference line unchanged if the road on which the vehicle is currently located is a ramp.

Figure 6:
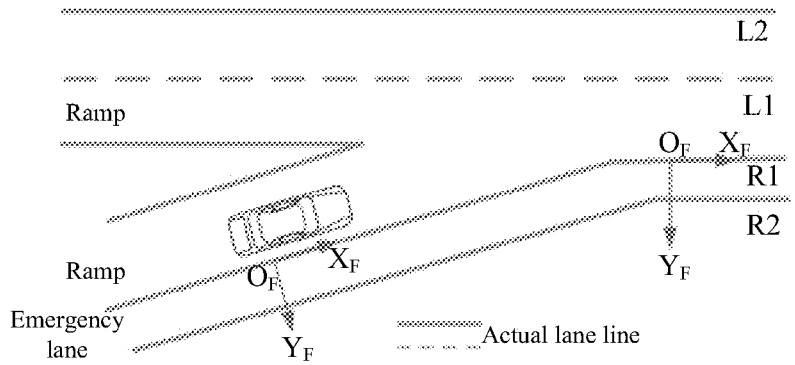
FIG. 6 is a schematic diagram of switching a reference line under ramp conditions according to an embodiment of the present invention.

For example, as shown in FIG. 6, when the road on which the vehicle is currently located is a ramp, the current reference line is maintained, and the corresponding driving coordinate system can be more consistent with the road trend.

Step S340: switching the reference line to the default road boundary line if the road on which the vehicle is currently located is a main road.

The reference line in this case can be switched with reference to FIG. 4, and the default road boundary line can also be, for example, the leftmost road boundary.

Figure 7:
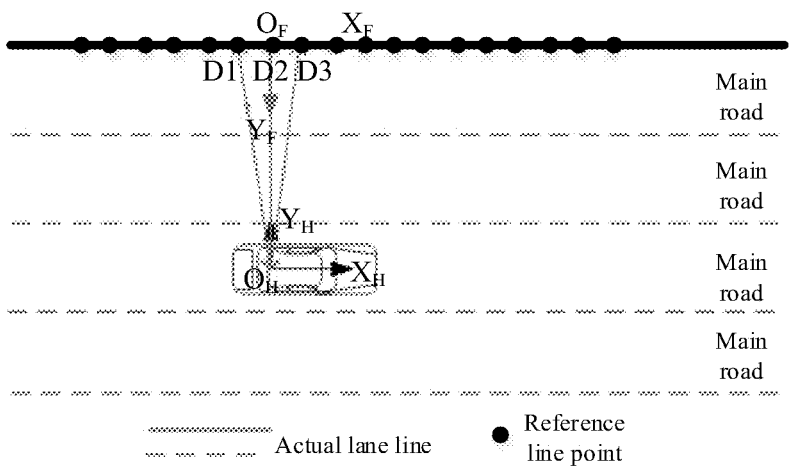
FIG. 7 is a schematic diagram of calculating the origin of a driving coordinate system according, to a preferred embodiment of the present invention.

Further, step S120 is the core of constructing the driving coordinate system, and as long as the origin of the coordinate system is determined, it is easier to determine the coordinate axis direction in step S130 and the final driving coordinate system in step S140. Therefore, FIG. 7 is a schematic diagram of calculating the origin of a driving coordinate system according to a preferred embodiment of the present invention, which provides the specific steps of determining a reference line point with the minimum distance between a vehicle position and the reference line as an origin $O_F$ of the driving coordinate system in step S120, namely, the following three steps:

1) setting several reference line points with the same spacing on the reference line. For example, the reference line points can be obtained by discretizing the equation of the reference line in the vehicle coordinates. Tice denser the reference line points, the better, for example, the spacing can be 0.1 m.

2) calculating the Euclidean distance between each reference line point and the vehicle position.

3) taking the point with the calculated shortest Euclidean distance as the origin $O_F$ of the driving coordinate system.

Specifically, the Euclidean distance between each reference line point on the reference line and the vehicle position is calculated to find the reference line point with the minimum distance between the vehicle position and the reference line (the reference line point corresponding to D2 in FIG. 7), that is, when $O_H O_F = \sqrt{(O-X_H)^2 + (O-Y_H)^2}$ is the minimum, the corresponding coordinate $(x_{Fi}, y_{Fi})$ is taken as the origin $O_F$ of the driving coordinate system.

Accordingly, a road guiding line direction is determined as an $X_F$ axis of the driving coordinate system based on the calculated origin $O_F$ of the driving coordinate system, and a direction following a left-hand rule with the $X_F$ axis is determined as a $Y_F$ axis of the driving coordinate system, thereby forming the final driving coordinate system $X_F O_F Y_F$.

In summary, a driving coordinate system is constructed according to the embodiments of the present invention, and through the driving coordinate system, the target-oriented area division can be well realized, and more accurate distance information can be obtained at the same time, particularly in the bend working condition, the longitudinal arc length is used in the driving coordinate system to represent the longitudinal distance of the road target and the like, and the distance between the vehicle and the road target can be expressed more realistically compared with the straight-line distance in the vehicle coordinate system.

Second Embodiment

Figure 8:
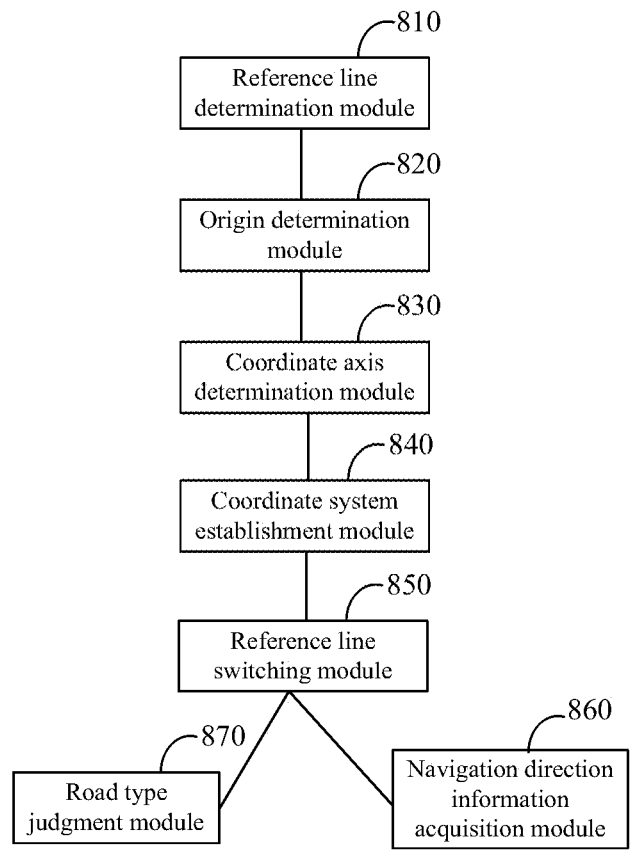
FIG. 8 is a structural schematic diagram of a driving coordinate system construction system according to the second embodiment of the present invention.

FIG. 8 is a structural schematic diagram of a driving coordinate system construction system according to the second embodiment of the present invention, and the driving coordinate system construction system is based on the same inventive idea as the driving coordinate system construction method of the foregoing embodiment. As shown in FIG. 8, the driving coordinate system construction system can comprise: a reference line determination module 810, used for determining a road boundary line on one side of a road on which a vehicle is located as a reference line for establishing a driving coordinate system; an origin determination module 820, used for determining a reference line point with the minimum distance between a vehicle position and the reference line as an origin $O_F$ of the driving coordinate system in a vehicle coordinate system; a coordinate axis determination module 830, used for determining a road guiding line direction as an $X_F$ axis of the driving coordinate system based on the origin $O_F$, and determining a direction following a left-hand rule with the road guiding line direction as a $Y_F$ axis of the driving coordinate system; and a coordinate system establishment module 840, used for forming the corresponding driving coordinate system based on the origin $O_F$, the $X_F$ axis and the $Y_E$ axis.

In a preferred embodiment, the driving coordinate system construction system can further comprise: a reference line switching module 850, used for switching the reference line to adjust the driving coordinate system during the driving process of the vehicle.

In a preferred embodiment, the driving coordinate system construction system can further comprise: a navigation direction information acquisition module 860, used for acquiring navigation direction information about the vehicle. In addition, the reference line switching module 150 switching the reference line comprises: the reference line switching module 850 taking a preset default road boundary line as the reference line; and the reference line switching module 850 acquiring the navigation direction information, and switching the reference line to a road boundary line on the navigation direction side indicated by the navigation direction information.

In a preferred embodiment, the driving coordinate system construction system can further comprise: a road type judgment module 870, used for determining a current road type. In addition, the reference line switching module 850 switching the reference line further comprises: maintaining the current reference line unchanged if the road on which the vehicle is currently located is a ramp; and switching the reference line to the default road boundary line if the road on which the vehicle is currently located is a main road.

In a preferred embodiment, the origin determination module 820 comprises (not shown in the figure): a point setting sub-module, used for setting several reference line points with the same spacing on the reference line, a distance calculation sub-module, used for calculating the Euclidean distance between each reference line point and the vehicle position; and an origin determination sub-module, used for taking the point with the calculated shortest Euclidean distance as the origin $O_F$ of the driving coordinate system.

It should be noted that the specific implementation details and effects of the driving coordinate system construction system according to the embodiment of the present invention and the driving coordinate system construction method of the foregoing embodiment are the same or similar, and will not be repeated here.

Third Embodiment

The third embodiment is the application of the solution of the first embodiment, and provides a method for determining the coordinates of a lane line, the method can comprise the following steps: constructing a driving coordinate system by using the method of the first embodiment; and calculating the coordinates of the lane line in the driving coordinate system.

Neither the lane line in the vehicle coordinate system nor the lane line in the driving coordinate system can be described by points, and the amount of data is large with inconvenience. However, referring to FIG. 2 again, it can be seen that the abscissa of each point on the lane line is the same in the driving coordinate system, and since the driving coordinate system is a coordinate system completely consistent with the trend of the lane line and the lane lines are parallel to each other, the coordinates of the curved lane line in the driving coordinate system can be described by only one parameter, that is, only the ordinate of the point on the lane line in the driving coordinate system can be calculated to determine the coordinates of the corresponding lane line.

Figure 9A:
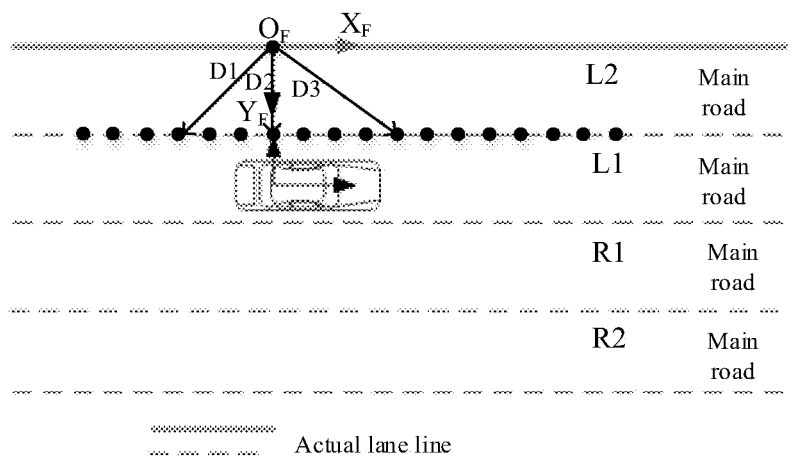
FIG. 9A is a schematic diagram of a preferred method for determining the coordinates of a lane line in the driving coordinate system according to the third embodiment of the present invention.

FIG. 9A is a schematic diagram of a preferred method for determining the coordinates of a lane line in the driving coordinate system according to the third embodiment of the present invention. Referring to FIG. 9A, calculating the coordinates of the lane line in the driving coordinate system can specifically comprise the following steps:

A1) discretizing the lane line to be calculated into a plurality of lane line points in the vehicle coordinate system.

As shown in FIG. 9A, taking the left lane line L1 as an example, in the case where the equation of L1 in the vehicle coordinate system is known, it is easy to discretize L1 into point information in the vehicle coordinate system. The points are preferably spaced as dense as possible, for example, the spacing is 0.1 m.

A2) calculating the Euclidean distance between each lane line point on the lane line to be calculated and the origin of the driving coordinate system, and taking the calculated shortest Euclidean distance as the abscissa of the lane line in the driving coordinate system.

Figure 9B:
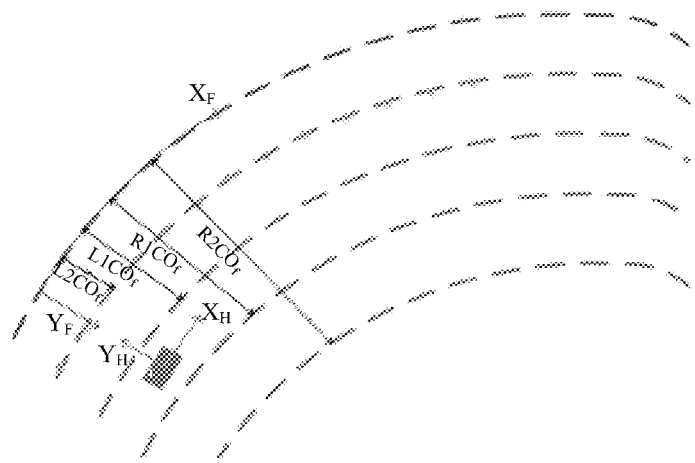
FIG. 9B is a schematic diagram of representing the coordinates of a lane line by using the abscissa of the lane line in the driving coordinate system according to the third embodiment of the present invention.

FIG. 9B is a schematic diagram of representing the coordinates of a lane line by using the abscissa of the lane line in the driving coordinate system according to the third embodiment of the present invention. Referring to FIG. 9B, it can be seen that the lane lines are parallel to each other, so the ordinate $X_F$ of the parallel corresponding points on each lane line is the same in absolute value, so that the coordinates of a curved lane line in the driving coordinate system can be described only, by the abscissa $Y_F$ of the lane line in the driving coordinate system (i.e., the distances $L1CO_f$, $L2CO_f$, $R1CO_f$ and $R2CO_f$ between the lane line and the reference line in the driving coordinate system). This is especially true for a straight lane.

In this regard, referring to FIG. 9A again, D2 is the distance from a certain lane line point on L1 to the origin $O_F$ the driving coordinate system, that is, the coordinates of the lane line point in the driving coordinate system can be represented by D2. The coordinate calculation of other lane lines in the driving coordinate system is similar.

Figure 9C:
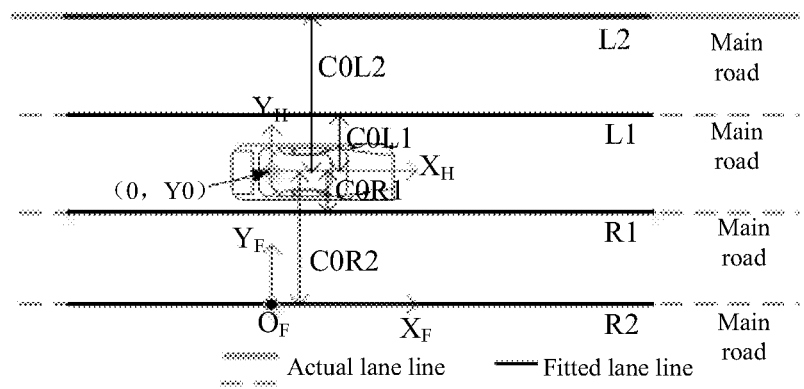
FIG. 9C is a schematic diagram of another preferred method for determining the coordinates of a lane line in the driving coordinate system according to the third embodiment of the present invention.

FIG. 9C is a schematic diagram of another preferred method for determining the coordinates of a lane line in the driving coordinate system according to the third embodiment of the present invention. Referring to FIG. 9C, calculating the coordinates of the lane line in the driving coordinate system can specifically comprise the following steps:

B1) fitting to obtain a cubic equation in one unknown of the lane line to be calculated in the vehicle coordinate system, wherein a constant term C0 of the cubic equation in one unknown reflects the shortest distance from the center point: of the vehicle to a corresponding lane line.

For example, the cubic equation in one unknown is $y=c0+c1*x+c2x^2+c3x^3$, wherein the vehicle coordinate system is positive with the left side, so the lane line c0 on the left side of the vehicle is positive, and the lane line C0 on the right side of the vehicle is negative. C0 reflects the shortest distance from the center point of the vehicle to the corresponding lane line, so the C0 value of the lane line in the vehicle coordinate system can be directly used to reflect the distance attribute of the vehicle from the lane line. As shown in FIG. 9C, for different lane lines, their corresponding C0 values can be represented as C0L1, C0L2, C0R1 and C0R2.

B2) determining the distance (0, Y0) of the center point of the vehicle in the driving coordinate system, calculating a difference value between the Y0 value and the C0 value corresponding to the lane line to be calculated, and using the difference value to represent the coordinates of the corresponding lane line in the driving coordinate system.

For example, referring to FIG. 9C again, the difference value is calculated according to the coordinates (0, Y0) of the center point of the vehicle in the driving coordinate system and the C0 of each lane line, so as to obtain the coordinates of each lane line in the driving coordinate system, for example, the coordinates for lane line L1 on the left side of the vehicle in the driving coordinate system are $L1CO_f=(Y0-C0L1)$. The coordinate calculation of other lane lines in the driving coordinate system is similar.

The method for calculating the coordinates of the lane line in the driving coordinate system shown in FIG. 9C has a smaller calculation amount and is more applicable than the method corresponding to FIG. 9A.

Further, referring to the first embodiment, the reference line can be switched during the driving process of the vehicle. Thus, the method according to the third embodiment of the present invention can further comprise: switching the reference line to adjust the driving coordinate system during the driving process of the vehicle, and calculating the coordinates of the lane line in the adjusted driving coordinate system. That is to say, the coordinates of the lane line are adaptively changed with the change of the driving coordinate system, so that the trend of the lane line can be more accurately reflected. For the method for switching the reference line, reference can be made to the first embodiment, and details are not described here.

In summary, the coordinates of a lane line are determined by using a driving coordinate system according to the third embodiment of the present invention. Compared with the conventional vehicle coordinate system, the driving coordinate system is capable of more truly expressing the relationship between the vehicle and the lane line, saving a lot of complicated calculation processes in the vehicle coordinate system, and contributing to the area division of the road target. For example, if the driving abscissa of the road target and the lane line are known, the magnitude can be directly judged to determine which area the road target is divided into by the lane line.

Fourth Embodiment

The fourth embodiment of the present invention provides a system for determining the coordinates of a lane line. The system is based on the same inventive idea as the method for determining the coordinates of a lane line according to the third embodiment, and adopts the driving coordinate system construction system according to the second embodiment. The system can comprise: the driving coordinate system construction system according to the second embodiment, used for constructing a driving coordinate system: and a lane line coordinate calculation module, used for calculating the coordinates of the lane line in the driving coordinate system.

Based on the fact that "the abscissa of each point on the lane line is the same in the driving coordinate system", in a preferred embodiment, the lane line coordinate calculation module can comprise: a discretization module, used for discretizing the lane line to be calculated into a plurality of lane line points in the vehicle coordinate system; and a first coordinate determination module, used for calculating the Euclidean distance between each lane line point on the lane line to be calculated and the origin of the driving coordinate system, and taking the calculated shortest Euclidean distance as the ordinate of the lane line in the driving coordinate system.

In another preferred embodiment, the lane line coordinate calculation module can comprise: a fitting module, used for fitting to obtain a cubic equation in one unknown of the lane line to be calculated in the vehicle coordinate system, wherein a constant term C0 of the cubic equation in one unknown reflects the shortest distance from the center point of the vehicle to a corresponding lane line; and a second coordinate determination module, used for determining the distance (0, Y0) of the center point of the vehicle in the driving coordinate system, calculating a difference value between the Y0 value and the C0 value corresponding to the lane line to be calculated, and using the difference value to represent the coordinates of the corresponding lane line in the driving coordinate system.

In addition, when the driving coordinate system construction system comprises the reference line switching module in the second embodiment, the lane line coordinate calculation module is further used for calculating the coordinates of the lane line in the adjusted driving coordinate system. That is to say, the coordinates of the lane line are adaptively changed with the change of the driving coordinate system, so as to more accurately reflect the correct trend of the bend lane line and the like, and contribute to the area division of the road target based on the lane line.

For the specific implementation details and beneficial effects of the fourth embodiment of the present invention, reference can be made to the third embodiment of the present invention, which will not be repeated here.

Fifth Embodiment

The fifth embodiment is the application of the solution of the first embodiment, and provides a method for determining the coordinates of a road target, the method can comprise: constructing a driving coordinate system by using the method of the first embodiment: and calculating the coordinates of the road target in the driving coordinate system.

Figure 10:
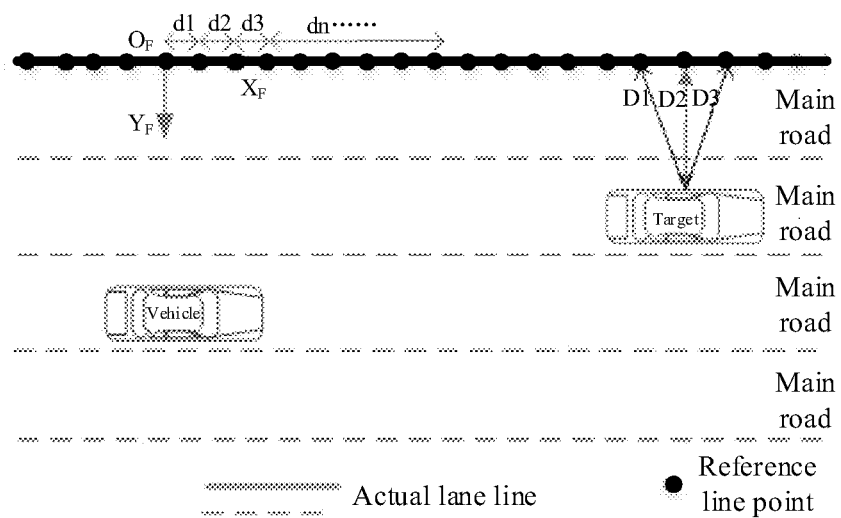
FIG. 10 is a schematic diagram of a method for determining the coordinates of a road target in a driving coordinate system according to the fifth embodiment of the present invention.

FIG. 10 is a schematic diagram of a method for determining the coordinates of a road target in a driving coordinate system according to an embodiment: of the present invention. The method is based on the method of determining the origin of the driving coordinate system based on reference line points in the first embodiment, and can comprise the following steps:

A1) traversing, from the origin. $O_F$, the reference line points toward the direction of the road target relative to the vehicle.

As shown in FIG. 10, the reference line points are numbered d1, d2, d3 ... dn to start traversing from the origin $O_F$, wherein according to the direction of the road target relative to the vehicle, it may be a forward traversal Or a backward traversal. In a preferred embodiment, the coordinates of the target and the reference line in the vehicle coordinate system are known, then the map points in the vehicle coordinate system can be traversed forward or backward from the origin $O_F$, wherein the forward/backward traversal is mainly determined by the positive or negative coordinates of the road target in the vehicle coordinate system. When the longitudinal distance of the road target in the vehicle coordinate system is positive, it is the forward traversal, and when the longitudinal distance of the road target in the vehicle coordinate system is negative, it is the backward traversal.

A2) calculating the Euclidean distance between the traversed reference line points and the road target, and taking the calculated shortest Euclidean distance as the abscissa of the road target in the driving coordinate system.

For example, the reference line points are traversed, and the Euclidean distance between the traversed reference line points and the road target is calculated. When the distance is the smallest (the distance is D2 in FIG. 10), the traversal stops, and the abscissa of the road target in the driving coordinate system (that is, the Euclidean distance D2 between the closest point and the road target) and the serial number of the closest point in the reference line are output.

A3) acquiring point serial number information of the reference line point corresponding to the calculated shortest Euclidean distance, calculating an arc length between the reference line point and the origin $O_F$, and taking the arc length as the ordinate of the road target in the driving coordinate system.

For example, through the previous calculation, the point serial number information of the closest point on the reference line corresponding to the road target can be obtained, and the arc length between this point and the origin of the driving coordinate can be calculated. As shown in FIG. 10, this arc length is calculated based on the cumulative Euclidean distance between points on the reference line, that is, d=d1+d2+d3+ ..., d is the ordinate of the road target in the driving coordinate system.

Further, referring to the first embodiment, the reference line can be switched during the driving process of the vehicle. Thus, the method according to the fifth embodiment of the present: invention can further comprise: switching the reference line to adjust the driving coordinate system during the driving process of the vehicle, and calculating the coordinates of the road target in the adjusted driving coordinate system. That is to say, the coordinates of the road target are adaptively changed with the change of the driving coordinate system, so that the correct location of the road target relative to the vehicle can be more accurately reflected in the working condition such as a bend. For the method for switching the reference line, reference can be made to the first embodiment, and details are not described here.

In summary, the coordinates of a road target are determined by using a driving coordinate system according to the fifth embodiment of the present invention. Compared with the conventional vehicle coordinate system, the driving coordinate system is capable of more truly expressing the distance between the vehicle and the road target, and contributing to the area division of the road target.

Sixth Embodiment

The sixth embodiment of the present invention provides a system for determining the coordinates of a road target. The system is based on the same inventive idea as the method for determining the coordinates of a road target according to the third embodiment, and adopts the driving coordinate system construction system according to the second embodiment. The system can comprise: the driving coordinate system construction system according to the second embodiment, used for constructing a driving coordinate system; and a target coordinate calculation module, used for calculating the coordinates of the road target in the driving coordinate system.

In a preferred embodiment, the target coordinate calculation module can comprise: a traversal module, used for traversing, from the origin $O_F$, the reference line points toward the direction of the road target relative to the vehicle; an abscissa calculation module, used for calculating the Euclidean distance between the traversed reference line points and the road target, and taking the calculated shortest Euclidean distance as the abscissa of the road target in the driving coordinate system; and an ordinate calculation module, used for acquiring point serial number information of the reference line point corresponding to the calculated shortest Euclidean distance, calculating an arc length between the reference line point and the origin $O_F$, and taking the arc length as the ordinate of the road target in the driving coordinate system.

In addition, when the driving coordinate system construction system comprises the reference line switching module in the second embodiment, the target coordinate calculation module is further used for calculating the coordinates of the road target in the adjusted driving coordinate system. That is to say, the coordinates of the road target are adaptively changed with the change of the driving coordinate system, so that the correct location of the road target relative to the vehicle can be more accurately reflected in the working condition such as a bend.

For the specific implementation details and beneficial effects of the sixth embodiment of the present invention, reference can be made to the third embodiment of the present invention, which will not be repeated here.

The above descriptions are only the preferred embodiments of the present invention and are not intended to limit the present invention. Any modification, equivalent replacement, improvement, etc., made within the spirit and principle of the present invention, such as adaptively changing the order of execution of steps and adjusting the connection relationship between functional modules, shall be included in the protection scope of the present invention.

A person skilled in the art can understand that all or part of the steps in the method of the foregoing embodiments can be implemented by a program instructing related hardware. The program is stored in a storage medium, and comprises several instructions for causing a single chip computer, a chip, or a processor to execute all or part of the steps of the method described in each embodiment of the present application. However, the aforementioned storage medium comprises various kinds of mediums that can store program codes, such as a U disk, a mobile hard disk, a Read-Only Memory (ROM), a Random Access Memory (RAM), a magnetic disk or an optical disk.

In addition, any combination of the various embodiments of the present invention may be made therebetween, which, as long as not violating the idea of the embodiments of the present invention, shall likewise be considered as contents disclosed in the embodiments of the present invention.

The invention claimed is:

1. A driving coordinate system construction method, wherein the driving coordinate system construction method is performed by a processor, and the method comprises:
   determining a road boundary line on one side of a road on which a vehicle is located as a reference line for establishing a driving coordinate system, and storing the reference line in a machine-readable medium;
   accessing the machine-readable medium to retrieve a vehicle position and the reference line, determining a reference line point with the minimum distance between the vehicle position and the reference line as an origin $O_F$ of the driving coordinate system in a vehicle coordinate system, and storing the origin $O_F$ in the machine-readable medium;
   accessing the machine-readable medium to retrieve the origin $O_F$, determining a road guiding line direction as an $X_F$ axis of the driving coordinate system based on the origin $O_F$, and determining a direction following a left-hand rule with the road guiding line direction as a $Y_F$ axis of the driving coordinate system;
   forming a corresponding driving coordinate system based on the origin $O_F$, the $X_F$ axis and the $Y_F$ axis;
   switching the reference line to adjust the driving coordinate system during a driving process of the vehicle; and
   causing various sensing devices on the vehicle to collect effective information based on the adjusted driving coordinate system, and causing an automatic driving computer to control the driving of the vehicle based on the collected effective information.

2. The driving coordinate system construction method according to claim 1, wherein the switching the reference line comprises:
   taking a preset default road boundary line as the reference line, acquiring navigation direction information about the vehicle, and changing the reference line to a road boundary line on a navigation direction side indicated by the navigation direction information; or
   determining a current road type when the navigation direction information does not exist, maintaining the reference line unchanged under the condition that the road on which the vehicle is currently located is a ramp, and switching the reference line to the preset default road boundary line under the condition that the road on which the vehicle is currently located is a main road.

3. A method of using a driving coordinate system, wherein the method is performed by a processor, and the method comprises:
   constructing the driving coordinate system using the driving coordinate system construction method according to claim 2; and
   causing the various sensing devices on the vehicle to collect the coordinates of a lane line and/or the coordinates of a road target based on the driving coordinate system, wherein the effective information includes the coordinates of the lane line and/or the coordinates of the road target.

4. The driving coordinate system construction method according to claim 1, wherein the determining the reference line point with the minimum distance between the vehicle position and the reference line as the origin $O_F$ of the driving coordinate system comprises:
   setting several reference line points with same spacing on the reference line;
   calculating the Euclidean distance between each reference line point and the vehicle position; and
   taking the point with the calculated shortest Euclidean distance as the origin $O_F$ of the driving coordinate system.

5. A method of using a driving coordinate system, wherein the method is performed by a processor, and the method comprises:
   constructing the driving coordinate system using the driving coordinate system construction method according to claim 4; and
   causing the various sensing devices on the vehicle to collect the coordinates of a lane line and/or the coordinates of a road target based on the driving coordinate system, wherein the effective information includes the coordinates of the lane line and/or the coordinates of the road target.

6. A method of using a driving coordinate system, wherein the method is performed by a processor, and the method comprises:
   constructing the driving coordinate system using the driving coordinate system construction method according to claim 1; and
   causing the various sensing devices on the vehicle to collect the coordinates of a lane line and/or the coordinates of a road target based on the driving coordinate system, wherein the effective information includes the coordinates of the lane line and/or the coordinates of the road target.

7. The method according to claim 6, wherein the calculating the coordinates of the lane line in the driving coordinate system comprises:
- discretizing the lane line to be calculated into a plurality of lane line points in the vehicle coordinate system; and
- calculating the Euclidean distance between each lane line point on the lane line to be calculated and the origin of the driving coordinate system, and taking the calculated shortest Euclidean distance as the abscissa of the lane line in the driving coordinate system,
- wherein for lane lines parallel to each other, the coordinates of the lane lines can be represented by the abscissa of the lane lines in the driving coordinate system.

8. The method according to claim 6, wherein calculating the coordinates of the lane line in the driving coordinate system comprises:
- fitting to obtain a cubic equation in one unknown of the lane line to be calculated in the vehicle coordinate system, wherein a constant term C0 of the cubic equation in one unknown reflects the shortest distance from the center point of the vehicle to a corresponding lane line; and
- determining the distance (0, Y0) of the center point of the vehicle in the driving coordinate system, calculating a difference value between the Y0 value and the C0 value corresponding to the lane line to be calculated, and using the difference value to represent the coordinates of the corresponding lane line in the driving coordinate system.

9. The method according to claim 6, wherein the calculating the coordinates of the road target in the driving coordinate system comprises:
- traversing, from the origin $O_F$, reference line points toward the direction of the road target relative to the vehicle;
- calculating the Euclidean distance between the traversed reference line points and the road target, and taking the calculated shortest Euclidean distance as the abscissa of the road target in the driving coordinate system; and
- acquiring point serial number information of the reference line point corresponding to the calculated shortest Euclidean distance, calculating an arc length between the reference line point and the origin $O_F$, and taking the arc length as the ordinate of the road target in the driving coordinate system.

10. A driving coordinate system construction system, wherein the system comprises:
- a machine-readable memory, wherein said machine-readable memory stores programs that can be executed on a processor; and
- the processor, wherein said processor implements the method according to any one of the claims 1-8 and 9 when executing the programs and causes the automatic driving computer to control the driving of the vehicle.

* * * * *